US012774398B2

(12) United States Patent
Milliery

(10) Patent No.: US 12,774,398 B2
(45) Date of Patent: Oct. 27, 2026

(54) BIODEGRADABLE AND RECYCLABLE NON-TOXIC COATING COMPOSITION

(71) Applicant: PAPKOT APAC LIMITED, Kowloon (HK)

(72) Inventor: Manuel Milliery, Paris (FR)

(73) Assignee: PAPKOT APAC LIMITED, Kowloon (HK)

( * ) Notice: Subject to any disclaimer, the term of this patent is extended or adjusted under 35 U.S.C. 154(b) by 0 days.

(21) Appl. No.: 19/252,077

(22) Filed: Jun. 27, 2025

(65) Prior Publication Data

US 2026/0055298 A1 Feb. 26, 2026

Related U.S. Application Data

(63) Continuation of application No. 18/870,526, filed as application No. PCT/EP2023/064759 on Jun. 1, 2023.

(30) Foreign Application Priority Data

Jun. 1, 2022 (FR) .................................. FR2205296

(51) Int. Cl.

| | |
|---|---|
| ***C09D 183/04*** | (2006.01) |
| ***C09D 5/02*** | (2006.01) |
| ***C09D 7/61*** | (2018.01) |
| ***C09D 7/63*** | (2018.01) |

(52) U.S. Cl.

CPC ........... *C09D 183/04* (2013.01); *C09D 5/027* (2013.01); *C09D 7/61* (2018.01); *C09D 7/63* (2018.01)

(58) Field of Classification Search

None

See application file for complete search history.

(56) References Cited

U.S. PATENT DOCUMENTS

| | | | |
|---|---|---|---|
| 11,135,567 | B1 | 10/2021 | Kabir et al. |
| 2019/0112502 | A1 | 4/2019 | Sloot et al. |

FOREIGN PATENT DOCUMENTS

| | | | | |
|---|---|---|---|---|
| DE | 19939152 A1 * | 2/2001 | ............. C08G 77/58 |
| GB | 1596107 * | 8/1981 | ............... C08K 3/36 |
| JP | 2006501342 A | 1/2006 | |
| JP | 2010184999 A | 8/2010 | |
| WO | 2022112566 A1 | 6/2022 | |

OTHER PUBLICATIONS

Machine translation of Markus et al., DE19939152A1 (Markus) (Year: 2001).*

Shao et al., Preparation and characterization of porous microcrystalline cellulose from corncob, Industrial Crops & Products, 2020 (Shao) (Year: 2020).*

Sulaiman et al., "The Effect of Microcrystalline Cellulose (MCC) on Coating Paint Film's Surface Performance as Non-stick Coating", Pigment & Resin Technology, Emerald Publishing Limited, Jun. 2020, 6 pages.

Neves et al., "The Influence of Silane Surface Modification on Microcrystalline Cellulose Characteristics", Carbohydrate Polymers, Elsevier Ltd., vol. 230, Nov. 11, 2019, 10 pages.

International Search Report and Written Opinion of the International Searching Authority issued on Aug. 23, 2023, in corresponding International Application No. PCT/EP2023/064759, 12 pages.

* cited by examiner

*Primary Examiner* — Keling Zhang

(74) *Attorney, Agent, or Firm* — Maier & Maier, PLLC

(57) ABSTRACT

A coating composition for a substrate, which includes: a microcrystalline cellulose composition, at least one silane, at least one acid catalyst, a liquid dispersion phase, and optionally at least one inorganic filler. Also, the use of this composition for the release coating of a substrate such as a paper surface or a metal surface. Finally, an article having at least one surface is coated with the coating composition.

11 Claims, No Drawings

BIODEGRADABLE AND RECYCLABLE NON-TOXIC COATING COMPOSITION

CROSS-REFERENCE TO RELATED APPLICATIONS

The present application is a continuation of U.S. patent application Ser. No. 18/870,526, filed on Nov. 29, 2024, which is a National Stage Entry of International Application No. PCT/EP2023/064759, filed on Jun. 1, 2023, which claims priority to French Patent Application No. 2205296, filed on Jun. 1, 2022, each of which are incorporated herein by reference in their entireties.

FIELD

The present invention relates to the general technical field of coatings of the sol-gel type. More specifically, the present invention is in the field of ecological, non-toxic and durable coatings. According a specific aspect, coatings of the invention may present release properties with respect to pressure-sensitive adhesive compositions, water repellent and/or oil repellent properties.

BACKGROUND

Release liners are important components of release surfaces that reversibly adhere to an adhesive layer. Examples of such surfaces are present on the non-adhesive (outer) surface of adhesive tapes, holders for stamps or labels and disposable accessories for food purposes such as for example paper cups for cakes.

In the field of pressure-sensitive adhesives, it is often desirable to prepare a product carrying an adhesive, for example a label or tape, and to store the product for prior its use. During storage, it is advantageous to stick the product bearing the adhesive to an intermediate surface from which it must be removed before use. For example, adhesive tapes around wound on a reel, so that the adhesive surface of one turn of the tape is glued to the non-adhesive surface of the previous turn. To unwind the tape prior its use, the upper turn of tape, with its adhesive, must be detached, typically from the inner turn. In another example, labels bearing an adhesive are frequently provided on a backing paper bearing a release surface from which they must be easily removed before their intended use.

This protective paper or release liner generally has a plastic film or glassine paper. Typically, the release liner is coated on one or both sides with a very thin layer of silicone or fluorocarbon polymers, acting as a backing to protect the adhesive surface of the tape when it is wound up or to protect a label or stamp when it is reversibly sticked onto its support. When a force is exerted, the release surface of the liner makes it possible to detach the wound tape, the label or the stamp from its release surface, without any detrimental effect of the adhesive properties of said tape, label or stamp.

To provide a liner, such as a paper support, with release properties, current coatings are based on several types of polymers which are used as release coatings, such as silicone networks, copolymers containing silicone, polymers with long alkyl or fluoroalkyl side chains, fluoropolymers and polyolefins. These polymers have surface energies lower than the surface energies of commonly used pressure sensitive adhesive (PSA) compositions, which is an important characteristic of PSA materials.

The use of sol-gel compositions to form release coating surfaces in one or more layers is known in the state of the art. However, these coating compositions have defects in durability and in their performance with regard to their release properties.

In order to overcome these defects, release compositions further comprising a silicone oil-type lubricating agent have been proposed in order to improve their release properties. However, these silicone oils have a limited thermal resistance, and it is always observed that the release properties of the coating decrease with use.

Furthermore, the aforementioned silicone oil-comprising coating compositions according to the prior art are used in the form of emulsion baths (or coating baths) which are used to coat the film supports, which are then crosslinked under thermal activation and/or under radiation (UV, electron beam), to form the water-repellent and release coating, which hinders the ease of implementation of the surface coating.

It is also known to add fluorinated silanes or complex synthetic polymers to sol-gel type coatings to improve their non-stick performance. However, the use of fluorinated compounds can be harmful to human health as well as to the environment because of the presence of fluorinated compounds and of high molecular weight synthetic polymers that prevents the biodegradation and the recycling of materials coated with compositions comprising such fluorinated silanes and/or such complex synthetic polymers.

Thus, such solutions are not sustainable because they involve the use of chemical compounds that limit the recyclability and/or the biodegradability of the PSA non-stick coating.

Consequently, there remains a need to provide a release coating composition with respect to PSA adhesives, in particular a release coating for surfaces, such as for example the surfaces of accessories intended for food or drinks, making it possible to overcome the aforementioned drawbacks. Furthermore, given the utility of such coatings in food or drink utensils, there is also a need to provide safe coatings that confer water and grease barrier properties to the coated substrate.

The use of a coating composition as described below enables a simple coating which is capable of providing coated articles which are not harmful to the human health or the environment. Advantageously, the coating has barrier properties against the diffusion of water and/or grease and is suitable for coating substrates that are in contact with water or greasy material such as for example food or drink recipients. According to a still advantageous aspect, the coating composition according to the invention presents reversibly adhesive properties that are non-non-adherent under the forces commonly applied by users, typically of the order of 1 to 500 g/cm, for example in order to open a single-use food container or to detach a stamp from its support. Even more advantageously, the reversibility of the non-adhesive nature of the composition persists over time regardless of the temperature or the humidity. In addition, the composition according to the invention does not diffuse into the substrate on which it is applied, nor into the adhesive layer with which it is put in contact.

SUMMARY

The present invention relates to a coating composition comprising:

- a cellulose composition, in an amount ranging from 0.1% to 15% by weight relative to the total weight of the coating composition, wherein cellulose is selected from microcrystalline cellulose, microfibrillated cellulose and a mixture thereof, at least one silane in an amount ranging from 50% to 80% by weight relative to the total weight of the coating composition, at least one acid catalyst in an amount ranging from 0.05% to 5.0% by weight relative to the total weight of the composition, optionally at least one inorganic bulking agent, and a liquid dispersion phase in sufficient quantity to reach 100% of the total weight of the coating composition.

The at least one silane can be selected from methyltriethoxysilane, methyltrimethoxysilane, tetraethoxysilane, trimethoxysilane, triethoxysilane and a mixture thereof. Preferably the at least one silane is selected from methyltriethoxysilane, methyltrimethoxysilane, tetraethoxysilane and a mixture thereof, even more preferably the at least one silane is methyltriethoxysilane.

When the coating composition further comprises at least one inorganic filler (or bulking agent), it can be selected from silicon dioxide, calcium carbonate, magnesium carbonate, oxide aluminium, phyllosilicates, inosilicates, tectosilicates, talc, zinc sulphate, magnesium oxide, zinc flakes, kaolin, albarin, dolomite, cerium oxide, sodium aluminate, calcium sulphate, barium sulphate, zinc stearate and mixtures thereof, preferably the at least one inorganic filler is selected from silicon dioxide, calcium carbonate and a mixture of these, even more preferably the at least one inorganic filler is silicon dioxide, in particular micronized silicon dioxide.

The at least one acid catalyst can be selected from monoprotic acids preferably further selected from hydrochloric acid, nitric acid and acetic acid; and polyprotic acids preferably further selected from carbonic acid, sulfuric acid and citric acid, and mixtures thereof; even more preferably the acid catalyst is hydrochloric acid.

In some embodiments, the coating composition comprises a cellulose composition that is a microcrystalline cellulose composition having crystals with an average diameter ranging from 30 to 200 μm, the average diameter being determined by sieving method.

In some embodiments, the dispersion phase is an aqueous phase or an hydro-alcoholic phase, preferably the dispersion phase is 100% water.

In some embodiments, the coating composition comprises:

a microcrystalline cellulose composition, preferably in an amount ranging from 1% to 15%, preferably ranging from 1 to 5%, by weight relative to the total weight of the composition, even more preferably the microcrystalline cellulose composition having crystals with an average diameter ranging from 30 to 200 μm, the average diameter being determined by sieving method;

at least one silane, preferably in an amount ranging from 60% to 80% by weight relative to the total weight of the composition, even more preferably the at least one silane being selected from methyltriethoxysilane, methyltrimethoxysilane, tetraethoxysilane and a mixture thereof, still more preferably the at least one silane is methyltriethoxysilane;

at least one acid catalyst, preferably in an amount ranging from 1.0% to 5.0% by weight relative to the total weight of the composition;

optionally at least one inorganic filler, preferably in an amount ranging from 0.1% to 10% by weight relative to the total weight of the composition, even more preferably the at least one inorganic filler being selected from silicon dioxide, calcium carbonate and a mixture thereof; and a liquid dispersion phase in sufficient quantity to reach 100% of the total composition.

In some embodiments, the coating composition comprises:

a microfibrillated cellulose composition, preferably in an amount ranging from 1% to 15%, preferably ranging from 1 to 5%, by weight relative to the total weight of the composition;

at least one silane, preferably in an amount ranging from 60% to 80% by weight relative to the total weight of the composition, even more preferably the at least one silane being selected from methyltriethoxysilane, methyltrimethoxysilane, tetraethoxysilane and a mixture thereof, still more preferably the at least one silane being methyltriethoxysilane;

at least one acid catalyst, preferably in an amount ranging from 1.0% to 5.0% by weight relative to the total weight of the composition;

optionally at least one inorganic filler, preferably in an amount ranging from 0.1% to 10% by weight relative to the total weight of the composition, even more preferably the at least one inorganic filler being selected from silicon dioxide, calcium carbonate and a mixture thereof; and a liquid dispersion phase, preferably 100% water, in sufficient quantity to reach 100% of the total composition.

The invention further relates to the use of a coating composition as described herein, wherein the substrate is a cellulose-comprising substrate or wherein the substrate is a plastic or metal substrate, preferably the substrate being a cellulose comprising substrate comprising at least 70% of cellulose by weight, relative to the total weight of the substrate.

In some embodiments, the coating is a release coating, preferably a release coating configured to reversibly adhering to an adhesive surface such as for example a layer comprising acrylates and/or polyacrylates.

Alternatively or additionally, the coating is a water and/or oil repellent coating of a cellulose-comprising substrate.

The invention also relates to a composite article comprising a substrate, said substrate being at least partially coated with a coating composition as described herein.

Typically, the substrate of the composite article comprises at least 70% of cellulose by weight, relative to the total weight of the substrate Alternatively, the substrate comprises or is made of metal or plastic.

In some embodiments, the composite article is selected from a food item, preferably a disposable food item, a food protection paper, a cardboard container for food use, disposable cutlery, paper recipients, paper cups, adhesive tapes, a support for stamps or labels, a mold for food cooking, in particular a mold for cakes or a metal mold for injection molding.

Definitions

In the present invention, the following terms have the following meanings:

"Anti-adhesive coating" or "release coating" refers to a coating capable of adhering (sticking) with an adhesive layer in a reversible manner. Reversible adhesion means the adhesion of an adhesive layer, in particular a pressure-sensitive adhesive (PSA) layer, to the release liner which is reversible upon application of a separating (or peeling) force exceeding a threshold greater than or equal to 1 g/cm, greater than or equal to 5 g/cm, preferably greater than or equal to 10 g/cm, even more preferably greater than or equal to 12 or 15 g/cm, while the adhesive layer maintains its adhesive properties past its separation from the release coating

DETAILED DESCRIPTION

In a first aspect, the invention relates to a composition, said composition comprising: a microcrystalline cellulose composition, at least one silane, at least one acid catalyst, and a liquid dispersion phase.

In particular, the coating composition of the invention comprises:

- a cellulose composition, in an amount ranging 0.1% to 15%, preferably from 1% to 15%, more preferably from 1% to 5% in weight relative to the total weight of the coating composition, wherein cellulose is selected from microcrystalline cellulose, microfibrillated cellulose and a mixture thereof;
- at least one silane in an amount ranging from 50% to 80% by weight relative to the total weight of the coating composition;
- at least one acid catalyst in an amount ranging from 0.05% to 5.0% by weight relative to the total weight of the composition;
- optionally at least one inorganic bulking agent; and
- a liquid dispersion phase in sufficient quantity to reach 100% of the total weight of the coating composition.

The composition according to the invention comprises at least one silane, in an amount ranging from 50% to 80%, preferably from 60% to 80%, even more preferably from 60% to 70%, by weight relative to the total weight of composition.

In one embodiment, the at least one silane is selected from methyltriethoxysilane, methyltrimethoxysilane, tetraethoxysilane, trimethoxysilane, triethoxysilane and a mixture thereof, preferably the at least one silane is selected from methyltriethoxysilane, methyltrimethoxysilane, tetraethoxysilane, and a mixture of these, more preferably the at least one silane is methyltriethoxysilane.

In some embodiments, the composition further includes at least one inorganic bulking agent.

When the composition according to the invention comprises at least one inorganic bulking agent, it may be in an amount ranging from 0.05% to 20%, preferably from 0.1% to 10%, even more preferably from 1% to 5%, by weight relative to the total weight of the composition.

The inorganic bulking agent can be chosen from silicon dioxide, calcium carbonate, magnesium carbonate, aluminum oxide, phyllosilicates, inosilicates, tectosilicates, talc, zinc sulphate, magnesium oxide, zinc flakes, kaolin, albarin, dolomite, cerium oxide, sodium aluminate, calcium sulfate, barium sulfate, zinc stearate and mixtures of these, preferably the at least one inorganic bulking agent is selected from silicon dioxide, calcium carbonate and a mixture thereof, more preferably the at least one inorganic bulking agent is micronized silicon dioxide.

In a preferred embodiment, the inorganic bulking agent is silicon dioxide, preferably in micronized form. Micronized silicon dioxide typically comprises silicon dioxide particles having an average diameter of 2 to 5 μm, typically 2 to 3 μm, characterized by the sieve method.

The at least one acid catalyst is present in an amount sufficient to allow the polymerization or vitrification of the at least one silane, when the composition is applied to a substrate. The composition according to the invention comprises at least one acid catalyst in an amount ranging from 0.01% to 5%, preferably from 0.05% to 5%, even more preferably from 0.2% to 1%, by weight per relative to the total weight of the composition.

The at least one acid catalyst can be selected from monoprotic acids, polyprotic acids and mixtures thereof. Preferably the monoprotic acids are selected from carbonic acid, sulfuric acid and citric acid and mixtures thereof. In one embodiment the monoprotic acids are selected from hydrochloric acid, nitric acid and acetic acid. In a preferred embodiment, the acid catalyst is hydrochloric acid. Thus, in some embodiments, the at least one acid catalyst is hydrochloric acid in an amount ranging from 0.01% to 5%, preferably from 0.05% to 5%, even more preferably from 0.2% to 1%, by weight per relative to the total weight of the composition.

The composition according to the invention comprises a cellulose composition in an amount ranging from 0.1% to 15%, preferably from 1% to 15% or from 0.5% to 10%, even more preferably from 1% to 5%, by weight relative to the total weight of the composition. The cellulose composition is selected from a microcrystalline cellulose composition, a microfibrillated cellulose composition and a mixture thereof.

In some embodiments, the cellulose composition is a microcrystalline cellulose composition. Microcrystalline cellulose (MCC) is a natural polymer composed of glucose units joined by a 1-4 beta glycosidic bond. Typically, the microcrystalline cellulose composition has crystals with an average diameter ranging from 30 to 200 μm, the average diameter being determined by the sieve method. In one embodiment, the microcrystalline cellulose composition has crystals with an average diameter ranging from 5 to 200 μm, preferably from 30 to 200 μm, even more preferably from 60 to 150 μm, the average diameter being determined by the sieve method. In one embodiment, the microcrystalline cellulose composition has crystals with an average diameter ranging from 60 to 100 μm. In some embodiments, the coating composition of the invention comprises an MCC composition in an amount ranging from 0.1% to 15%, preferably from 1% to 15% or from 0.5% to 10%, even more preferably from 1% to 5%, by weight relative to the total weight of the coating composition.

In some embodiments, the cellulose composition is a microfibrillated cellulose (MFC) composition. Microfibrillated cellulose is a cellulose-based product and is described, for example, in the U.S. Pat. No. 4,374,702 application. Microfibrillated cellulose has at least one reduced length scale (diameter, fiber length) compared to non-fibrillated cellulose. In (non-fibrillated) cellulose, which is the starting product for producing microfibrillated cellulose, no, or at least not a significant or not even a noticeable portion of individualized and "separated" cellulose "fibrils" can be found. The cellulose in fibers is an aggregation of fibrils. Typical cellulose fibrils are aggregated into microfibrils which are further aggregated into larger fibril bundles and finally into cellulosic fibres. The diameter of cellulose fibres is typically in the range 10-50 μm (with the length of these fibres being even greater). When the cellulose fibres are microfibrillated, a heterogeneous mixture of "released" fibrils with cross-sectional dimensions and lengths from the nm to μm scale may result. Fibrils and bundles of fibrils may coexist in the resulting microfibrillated cellulose.

In exemplary embodiments of the present invention, the microfibrillated cellulose has at least one length scale, i.e. fibril diameter and/or fibril length, that is reduced vis-à-vis the fiber diameter and/or fiber length of the non-fibrillated cellulose; preferably wherein the diameter of the microbrillated cellulose fibrils making up the microfibrillated cellulose of the present invention is in the nanometer range. i.e. from 1 nm to 1000 nm, preferably, and on average, from 10 nm to 500 nm. Individual fibrils or fibril bundles can be identified and easily determined by any means known in the art, such as for example by way of conventional optical microscopy, for example at a magnification of 40×.

In some embodiments, the coating composition of the invention comprises an MFC composition in an amount ranging from 0.1% to 15%, preferably from 1% to 15% or from 0.5% to 10%, even more preferably from 1% to 5%, by weight relative to the total weight of the coating composition.

The aforementioned constituents can be dispersed in any dispersion phase known in the art. In one embodiment, the dispersion phase is an aqueous phase or a hydroalcoholic phase. In one embodiment, the hydroalcoholic phase consists of water and at least one short-chain alcohol, i.e. a C1-C4 chain alcohol, in an amount of at least 5%, at least 10%, at least 20% or at least 30% by weight per relative to the total weight of the hydroalcoholic phase. For instance, the at least one short-chain alcohol is selected from ethanol, methanol, isopropanol, butanol and a mixture thereof.

The dispersion phase is typically in an amount sufficient to disperse the ingredients of the composition. According to a variant, the dispersion phase is in sufficient quantity (QSP) to reach 100% of the total weight of the coating composition. Typically, the dispersion phase is in an amount ranging from 15% to 40% by weight relative to the total weight of the composition. According to a variant, the ingredients of the composition, such as the microcrystalline cellulose and/or the inorganic bulking agent are in the form of a suspension in their dispersion phase, in which case the dispersion phase of the ingredients constitutes the dispersion phase of the composition according to the invention.

In a preferred embodiment, the dispersion phase is 100% water.

According to some embodiments, the coating composition comprises:

a composition of cellulose, preferably in an amount ranging from 1% to 15%, even more preferably from 1% to 5%, wherein cellulose is selected from microcrystalline cellulose, microfibrillated cellulose and a mixture thereof;

at least one silane as described above, preferably in an amount ranging from 50% to 80%, preferably from 60% to 80%, even more preferably from 60% to 70%;

at least one acid catalyst, as described above, in an amount sufficient for the polymerization of the at least one silane, preferably in an amount ranging from 0.01% to 5% preferably 0.05% to 5.0%, more preferably from 0.2% to 1%; and a liquid dispersion phase in an amount sufficient to reach 100% of the total composition, typically in an amount ranging from 15% to 40%;

the percentages being expressed by weight relative to the total weight of the composition.

According to some embodiments, the coating composition comprises:

a cellulose composition selected from MCC, MFC or a combination thereof, preferably in an amount ranging from 1% to 15%, even more preferably from 1% to 5%;

at least one silane as described above, preferably in an amount ranging from 50% to 80%, preferably from 60% to 80%, even more preferably from 60% to 70%; preferably the at least one silane being selected from methyltriethoxysilane, methyltrimethoxysilane, tetraethoxysilane and a mixture of these, even more preferably the at least one silane being methyltriethoxysilane;

at least one acid catalyst, preferably hydrochloric acid, in an amount sufficient for the polymerization of the at least one silane, preferably in an amount ranging from 0.01% to 5% preferably 0.05% to 5.0%, more preferably from 0.2% to 1%; and a liquid dispersion phase in an amount sufficient to reach 100% of the total composition, typically in an amount ranging from 15% to 40%;

the percentages being expressed by weight relative to the total weight of the composition.

According to some embodiments, the coating composition comprises:

a composition of microcrystalline cellulose, preferably in an amount ranging from 1% to 15%, even more preferably from 1% to 5%; still more preferably the microcrystalline cellulose composition having crystals with an average diameter ranging from 5 to 200 μm 30 to 200 μm, from 60 μm to 200 μm preferably from 60 μm to 150 μm, more preferably from 60 μm to 100 μm, the average diameter being determined by the sieve method;

at least one silane as described above, preferably in an amount ranging from 50% to 80%, preferably from 60% to 80%, even more preferably from 60% to 70%; preferably the at least one silane being selected from methyltriethoxysilane, methyltrimethoxysilane, tetraethoxysilane and a mixture of these, even more preferably the at least one silane being methyltriethoxysilane;

at least one acid catalyst, preferably hydrochloric acid, in an amount sufficient for the polymerization of the at least one silane, preferably in an amount ranging from 0.01% to 5% preferably 0.05% to 5.0%, more preferably from 0.2% to 1%; and a liquid dispersion phase in an amount sufficient to reach 100% of the total composition, typically in an amount ranging from 15% to 40%;

the percentages being expressed by weight relative to the total weight of the composition.

According to some embodiments, the coating composition comprises:

a composition of microcrystalline cellulose, preferably in an amount ranging from 1% to 15%, even more preferably from 1% to 5%; still more preferably the microcrystalline cellulose composition having crystals with an average diameter ranging from 5 to 200 μm 30 to 200 μm, from 60 μm to 200 μm preferably from 60 μm to 150 μm, more preferably from 60 μm to 100 μm, the average diameter being determined by the sieve method;

at least one silane as described above, preferably in an amount ranging from 50% to 80%, preferably from 60% to 80%, even more preferably from 60% to 70%; preferably the at least one silane being selected from methyltriethoxysilane, methyltrimethoxysilane, tetraethoxysilane and a mixture of these, even more preferably the at least one silane being methyltriethoxysilane;

at least one acid catalyst, preferably hydrochloric acid, in an amount sufficient for the polymerization of the at least one silane, preferably in an amount ranging from 0.01% to 5% preferably 0.05% to 5.0%, more preferably from 0.2% to 1%;

at least one inorganic bulking agent, preferably in an amount ranging from 1% to 5% by weight relative to the total weight of the composition, even more preferably the at least one inorganic bulking agent being silicon dioxide, in particular micronized silicon dioxide, and a liquid dispersion phase preferably in an amount ranging from 15% to 40%, even more preferably the dispersion phase being 100% water;

the percentages being expressed by weight relative to the total weight of the composition.

In some embodiments, the coating composition comprises:

a microcrystalline cellulose composition, preferably in an amount ranging from 1% to 5% by weight relative to the total weight of the composition, even more preferably the microcrystalline cellulose composition having crystals with an average diameter ranging from 60 to 150 μm, the average diameter being determined by the sieve method;

at least one silane, preferably in an amount ranging from 60% to 70%, the at least one silane being chosen from methyltriethoxysilane, methyltrimethoxysilane, tetraethoxy-silane and a mixture thereof, preferably the at least one silane being methyltriethoxysilane;

at least one acid catalyst, preferably hydrochloric acid, more preferably in an amount ranging from 0.2% to 1.0% by weight relative to the total weight of the composition;

at least one inorganic bulking agent, preferably in an amount ranging from 1% to 5% by weight relative to the total weight of the composition, the at least one inorganic bulking agent being chosen from calcium carbonate, silicon, in particular micronized silicon dioxide, and a mixture thereof, more preferably the at least one inorganic bulking agent being silicon dioxide, in particular micronized silicon dioxide, and a liquid dispersion phase in sufficient quantity to reach 100% of the total composition, in an amount ranging from 15% to 40%, even more preferably the dispersion phase being 100% water;

the percentages being expressed by weight relative to the total weight of the composition.

In some embodiments, the coating composition comprises:

a cellulose composition selected from an MCC composition or an MFC composition, preferably in an amount ranging from 1% to 5% by weight relative to the total weight of the composition;

at least one silane, preferably in an amount ranging from 60% to 70%, the at least one silane being chosen from methyltriethoxysilane, methyltrimethoxysilane, tetraethoxy-silane and a mixture thereof, preferably the at least one silane being methyltriethoxysilane;

at least one acid catalyst, preferably hydrochloric acid, more preferably in an amount ranging from 0.2% to 1.0% by weight relative to the total weight of the composition;

at least one inorganic bulking agent, preferably in an amount ranging from 1% to 5% by weight relative to the total weight of the composition, the at least one inorganic bulking agent being chosen from calcium carbonate, silicon, in particular micronized silicon dioxide, and a mixture thereof, more preferably the at least one inorganic bulking agent being silicon dioxide, in particular micronized silicon dioxide, and a liquid dispersion phase in sufficient quantity to reach 100% of the total composition, in an amount ranging from 15% to 40%, even more preferably the dispersion phase being 100% water;

the percentages being expressed by weight relative to the total weight of the composition.

In some embodiments, the coating composition comprises:

a microcrystalline cellulose composition, preferably in an amount ranging from 1% to 5% by weight relative to the total weight of the composition, even more preferably the microcrystalline cellulose composition having crystals with an average diameter ranging from 60 to 150 μm, the average diameter being determined by the sieve method;

at least one silane, preferably in an amount ranging from 60% to 70%, the at least one silane being chosen from methyltriethoxysilane, methyltrimethoxysilane, tetraethoxy-silane and a mixture thereof, preferably the at least one silane being methyltriethoxysilane;

at least one acid catalyst, preferably hydrochloric acid, more preferably in an amount ranging from 0.2% to 1.0% by weight relative to the total weight of the composition;

at least one inorganic bulking agent, preferably in an amount ranging from 1% to 5% by weight relative to the total weight of the composition, the at least one inorganic bulking agent being chosen from calcium carbonate, silicon, in particular micronized silicon dioxide, and a mixture thereof, more preferably the at least one inorganic bulking agent being silicon dioxide, in particular micronized silicon dioxide, and a liquid dispersion phase in sufficient quantity to reach 100% of the total composition, in an amount ranging from 15% to 40%, even more preferably the dispersion phase being 100% water;

the percentages being expressed by weight relative to the total weight of the composition.

In some embodiments, the coating composition comprises:

a MFC composition, preferably in an amount ranging from 1% to 5% by weight relative to the total weight of the composition;

at least one silane, preferably in an amount ranging from 60% to 70%, the at least one silane being chosen from methyltriethoxysilane, methyltrimethoxysilane, tetraethoxy-silane and a mixture thereof, preferably the at least one silane being methyltriethoxysilane;

at least one acid catalyst, preferably hydrochloric acid, more preferably in an amount ranging from 0.2% to 1.0% by weight relative to the total weight of the composition;

at least one inorganic bulking agent, preferably in an amount ranging from 1% to 5% by weight relative to the total weight of the composition, the at least one inorganic bulking agent being chosen from calcium carbonate, silicon, in particular micronized silicon dioxide, and a mixture thereof, more preferably the at least one inorganic bulking agent being silicon dioxide, in particular micronized silicon dioxide, and a liquid dispersion phase in sufficient quantity to reach 100% of the total composition, in an amount ranging from 15% to 40%, even more preferably the dispersion phase being 100% water;

the percentages being expressed by weight relative to the total weight of the composition.

The coating composition of the invention is suitable for conferring release coatings; as defined above, on substrates such as cellulose-comprising-substrates, metal substrates or plastic substrates. Furthermore, the coating composition of the invention is suitable for conferring release water and/or oil barrier (repellent) coatings, on substrates such as cellulose-comprising-substrates, metal substrates or plastic substrates, preferably on cellulose-comprising-substrates.

Thus, in a second aspect, the invention relates to the use of the coating composition according to any of the aforementioned embodiments, for the coating of a substrate.

In some embodiments, the coating is a release coating, a water-repellent (or water-barrier) and/or oil repellent (or oil-barrier or grease barrier), preferably the coating is a release coating.

Alternatively, the invention relates to a process for preparing a release coating, a water-repellent coating and/or an oil repellent coating, preferably a release coating, the process comprising bringing a substrate into contact with the composition according to any one of the embodiments described above.

According some embodiments, the use or the coating process according to the invention relates to a release coating, in particular a release coating capable of adhering with an adhesive layer in a reversible manner as defined above. According to some other embodiments, the use or the coating process according to the invention relates to the coating against the diffusion of water or oil (fatty or greasy) substances, in particular in the coating of cellulosic substrates of articles intended for food and/or drink applications or utensils.

In certain embodiments, the substrate is a cellulosic substrate, a metal substrate, or a plastic substrate, preferably the substrate being a cellulosic substrate. By cellulosic substrate or cellulose-comprising substrate is meant a substrate comprising at least 70% of cellulose by weight, relative to the total weight of the substrate. Cellulose-comprising substrates can be selected from paper, treated paper, glassine paper, cardboard, cellulosic support, low-porous cellulosic support and wood, preferably selected from paper, glassine paper, and cardboard.

In some embodiments, the process for coating a substrate includes the steps of:

a) provide a substrate,
b) providing a coating composition according to the invention, then
c) applying the coating composition to at least a part, preferably at least a surface of the substrate to obtain a preliminary composite article, then
d) drying the preliminary composite article at a temperature ranging from 30° C. to 280° C. to obtain a coated substrate.

In some embodiments, the process comprises the steps of:

a) providing a substrate selected among cellulose-comprising substrates, metals or plastic substrates,
b) preparing a coating composition according to any one of the embodiments above,
c) applying the coating composition on at least one surface of the substrate to obtain a preliminary composite coated article, and
d) drying the preliminary composite coated article at a temperature ranging from 20° C. for several days to 280° C. for less than 1 minute, to obtain the composite coated article.

In a third aspect, the invention relates to a composite article comprising a substrate, said substrate being at least partially coated with the coating composition according to the invention. Advantageously, the coating composition according to the invention is capable of reversibly adhering with an adhesive surface, in particular a surface of a pressure-sensitive adhesive layer, such as a layer comprising acrylates and/or polyacrylates such as the layers adhesives present in Loctite® 592, Technomelt® PS, Extra Strong Premium Carpet Tape NIU 4202® marketed by Scotch.

In certain embodiments, the composite article comprises a cellulosic, as defined above, plastic, or metallic substrate body.

In some embodiments, the substrate comprises at least 70% of cellulose by weight, relative to the total weight of the substrate. In some embodiments, the substrate body comprises, essentially consists of or it is made of metal or plastic.

In some embodiments, the coated article is selected from a food item, preferably a disposable food item, a food protection paper, a cardboard container for food use, disposable cutlery, paper recipients, paper cups, adhesive tapes, a support for stamps or labels, a mold for food cooking, in particular a mold for cakes or a metal mold for injection molding.

According to one embodiment, the article is chosen from a food article, in particular a disposable food article, a food protection paper, a cardboard container for food use, disposable cutlery, adhesive tapes, a support for stamps or labels, a mold for cooking food, in particular a mold for cakes or a metal mold for injection molding.

According to a fourth aspect, the invention relates to a composite coated article comprising:

a first layer consisting of a substrate as described above, typically selected among cellulose-comprising substrates, metals or plastic substrates, preferably cellulose-comprising substrates, and at least a second layer comprising the coating composition according to any one of the above embodiments.

In one embodiment, the composite coated article is obtainable or directly obtained by the coating of a substrate with the coating method of the invention.

In one embodiment, the composite coated article is a preliminary composite coated article.

In one embodiment, the composite coated article is a (dried) composite coated article. It should be understood that, the drying step (d) removes the dispersing phase of the coating composition. Accordingly, the composite coated article comprises:

a first layer consisting of a substrate as described above, typically selected among cellulose-comprising substrates, metals or plastic substrates, preferably cellulose-comprising substrates, and at least a second layer comprising the cellulose (MCC, MFC or a combination thereof) in the condensed-by the-acid-catalyst at least one silane coating composition as described above.

The composite coated article of this invention is therefore able present release properties as defined above and/or to retain inside or outside the packaging every liquid part (water, oil . . . ) avoiding any contamination or leaking.

EXAMPLES

The present invention is further illustrated by the following examples in a non-limitative manner.

Example 1: Composition According to the Invention

Compositions A to G according to the invention are prepared by mixing the constituents according to Table 1.

TABLE 1

| Compositions A-G for the non-stick coating according to example 1. | | | | | | | |
|---|---|---|---|---|---|---|---|
| | A | B | C | D | E | F | G |
| MCC (d) | 3 g (80 μm) | 3 g (80 μm) | 3 g (60 μm) | 3 g (80 μm) | 3 g (80 μm) | 3 g (20 μm) | 3 g (140 μm) |
| TEOS | — | 65 g | — | — | — | — | — |
| MTMS | — | — | — | — | 65 g | — | — |
| MTES | 65 g | — | 65 g | 65 g | — | 65 | 65 |
| Inorganic filler | 2.25 g m*$SiO_2$ | — | 2.25 g m* $SiO_2$ | 2.25 g $CaCO_3$ | 2.25 g m* $SiO_2$ | 2.25 g m* $SiO_2$ | 2.25 g m* $SiO_2$ |
| HCl | | | | 0.6 g | | | |
| Dispersion phase: water | | | | QSP 100 g | | | |

MCC: microcrystalline cellulose; (d): average diameter of the MCC crystals; TEOS: tetraethoxysilane; MTMS: methyltrimethoxysilane; MTES: methyltriethoxysilane, m*$SiO_2$: micronized silicon dioxide.

The ingredients according to compositions A-G have been mixed for 2 to 24 hours (ideally between 6 and 18). The viscosity of compositions A-G after mixing being less than 100 cps at 25° C.

The resulting coating compositions ("sol" compositions) are then applied to a paper substrate to form a release layer.

The release coat was applied in a single coat with a bar coater on A4 in quantities of between 1 ml and 4 ml of A4 sheet liner (55 gsm) of Prego® paper manufactured by UPM.

The paper thus coated was then dried in the oven at 150° C. for 30 min.

Example 2: Release Properties

Materials and Methods

In order to quantitatively measure the release anti-adhesive) properties of the compositions according to Example 1, we used a Seiko Instruments Dynamic Mechanical Analyzer machine.

5 mm×30 mm rectangular samples of paper coated with each of the compositions A-G according to Example 1 of were prepared and tested in tension mode with the Seiko® DMS110 dynamic mechanical analyzer console, according to the conditions detailed below.

The samples were:

cooled to −30° C. and left to equilibrate at this temperature for 15 minutes (condition 1), then heated at a rate of 2° C./min up to 200° C. (condition 2), then cooled to ambient temperature (condition 3).

Condition 4 consisted of maintaining the samples for 24 hours at 38° C. and 90% relative humidity.

The procedure was repeated a total of four times for each sample.

Results

The results are shown in Table 2.

TABLE 2

| | Samples coated with coating compositions A-G | | | |
|---|---|---|---|---|
| | Condition 1 | Condition 2 | Condition 3 | Condition 4 |
| Peel adhesion (g/cm) | <10 g | <12 | <12 | <10 |

The samples coated with the compositions A-G according to the invention maintained the reversibility of the non-stick character of independently of the temperature or the humidity according to the conditions 1-4.

In addition, the release properties of coatings with Compositions A-G have been empirically confirmed by reversibly bonding commercial adhesives such as Avery® or 3M® brand adhesive labels, dual-adhesive carpet tapes, and other acrylic or polyacrylate based stickers on samples coated with compositions A-G.

Example 3: Oil-Water Repelency and Release Properties

The oil and water repellency properties of coating compositions according to the invention were assessed by comparing a comparative sol-gel coating, a sol-gel with MCC according to the invention, and a sol-gel with MFC according to the invention using the TAPPI Cobb 30-minute standard test. The Cobb test, based on the TAPPI 441 test method, measures the quantity of water absorbed by nonbibulous paper, paperboard, and corrugated fiberboard in a specified time under standardized conditions. Additionally, we carried out a test for release properties using the FINAT test method 3 with a standard adhesive, 7475.

The following test conditions were assessed:

(i) Sol-gel standard applied in 1 layer with a dry weight of 8 gsm (ii) Sol-gel MCC applied in 1 layer with a dry weight of 6 gsm (iii) Sol-gel MFC applied in 1 layer with a dry weight of 5 gsm For the synthesis of (ii), we used MCC 80 μm from Sigma Aldrich in the case of and for MFC-sol-gel (iii), the MFC was a commercial grade named Exilva® P 01-V from Borregaard.

The results are presented on table 3.

TABLE 3

| | Comparative Sol-gel coating composition | Sol-gel MCC according to the invention | Sol-gel MFC according to the invention |
|---|---|---|---|
| MCC | — | 1-5% w/w | — |
| MFC | — | — | 1-5% w/w |
| Oil-repelency (gsm) | 24 | 9 | 7 |
| water-repelency (gsm) | 29 | 4 | 3 |
| Release properties' score | No release properties | 86 | 84 |

The sol-gel with MCC and the sol-gel with MFC showed improved results compared to the standard sol-gel in both oil and water Cobb values, and nearly equivalent results in the FINAT release test with a standard adhesive, 7475 where standard sol-gel coating failed to show any release properties. This further demonstrates the efficacy and versatility of the invention's coating compositions.

The invention claimed is:

1. A coating composition, said composition comprising:

a microcrystalline cellulose, in an amount ranging from 1% to 15% by weight relative to the total weight of the coating composition;

at least one silane in an amount ranging from 50% to 80% by weight relative to the total weight of the coating composition, said at least one silane is selected from the group consisting of methyltriethoxysilane, methyltrimethoxysilane, tetraethoxysilane, trimethoxysilane, triethoxysilane, and a mixture thereof;

at least one acid catalyst in an amount ranging from 0.05% to 5.0% by weight relative to the total weight of the composition, wherein the at least one acid catalyst is hydrochloric acid;

optionally at least one inorganic filler; and a liquid dispersion phase in sufficient quantity to reach 100% of the total weight of the coating composition, wherein the liquid dispersion phase is 100% water; wherein the microcrystalline cellulose has crystals with an average diameter ranging from 30 to 200 μm, the average diameter being determined by sieving method.

2. The coating composition according to claim 1, wherein the at least one silane is selected from the group consisting of methyltriethoxysilane, methyltrimethoxysilane, tetraethoxysilane, and a mixture thereof.

3. The coating composition according to claim 1, wherein the at least one inorganic filler is selected from the group consisting of silicon dioxide, calcium carbonate, magnesium carbonate, oxide aluminium, phyllosilicates, inosilicates, tectosilicates, talc, zinc sulphate, magnesium oxide, zinc flakes, kaolin, albarin, dolomite, cerium oxide, sodium aluminate, calcium sulphate, barium sulphate, zinc stearate and mixtures thereof.

4. A composition for the release coating of a substrate comprising the coating composition according to claim 1.

5. A method of coating a substrate, comprising applying to the substrate a coating composition according to claim 1 for coating the substrate, wherein the substrate is a cellulose-comprising substrate or wherein the substrate is a plastic or metal substrate.

6. The method according to claim 5, wherein the coating is a release coating.

7. The method according to claim 5, wherein the coating is a water and/or oil repellent coating of the substrate.

8. A composite article comprising a substrate, said substrate being at least partially coated with a release coating composition for a substrate according to claim 1.

9. The composite article according to claim 8, wherein the substrate comprises at least 70% of cellulose by weight, relative to the total weight of the substrate.

10. The composite article according to claim 8, wherein the substrate is made of metal or plastic.

11. The composite article according to claim 8, said article being selected from a food item, a food protection paper, a cardboard container for food use, disposable cutlery, paper recipients, paper cups, adhesive tapes, a support for stamps or labels, a mold for food cooking, and a metal mold for injection molding.

* * * * *